May 27, 1952

E. PLEASANCE 2,598,599

WHEEL ALIGNMENT GAUGE

Filed May 8, 1948

E. PLEASANCE
INVENTOR.

BY E. C. McRae
J. L. Faulkner
T. H. Oster

ATTORNEYS

May 27, 1952 E. PLEASANCE 2,598,599
WHEEL ALIGNMENT GAUGE

Filed May 8, 1948 6 Sheets-Sheet 5

E. PLEASANCE
INVENTOR.

BY E. C. McRae
J. R. Faulkner
T. H. Oster
ATTORNEYS

May 27, 1952     E. PLEASANCE     2,598,599
WHEEL ALIGNMENT GAUGE
Filed May 8, 1948                                               6 Sheets-Sheet 6
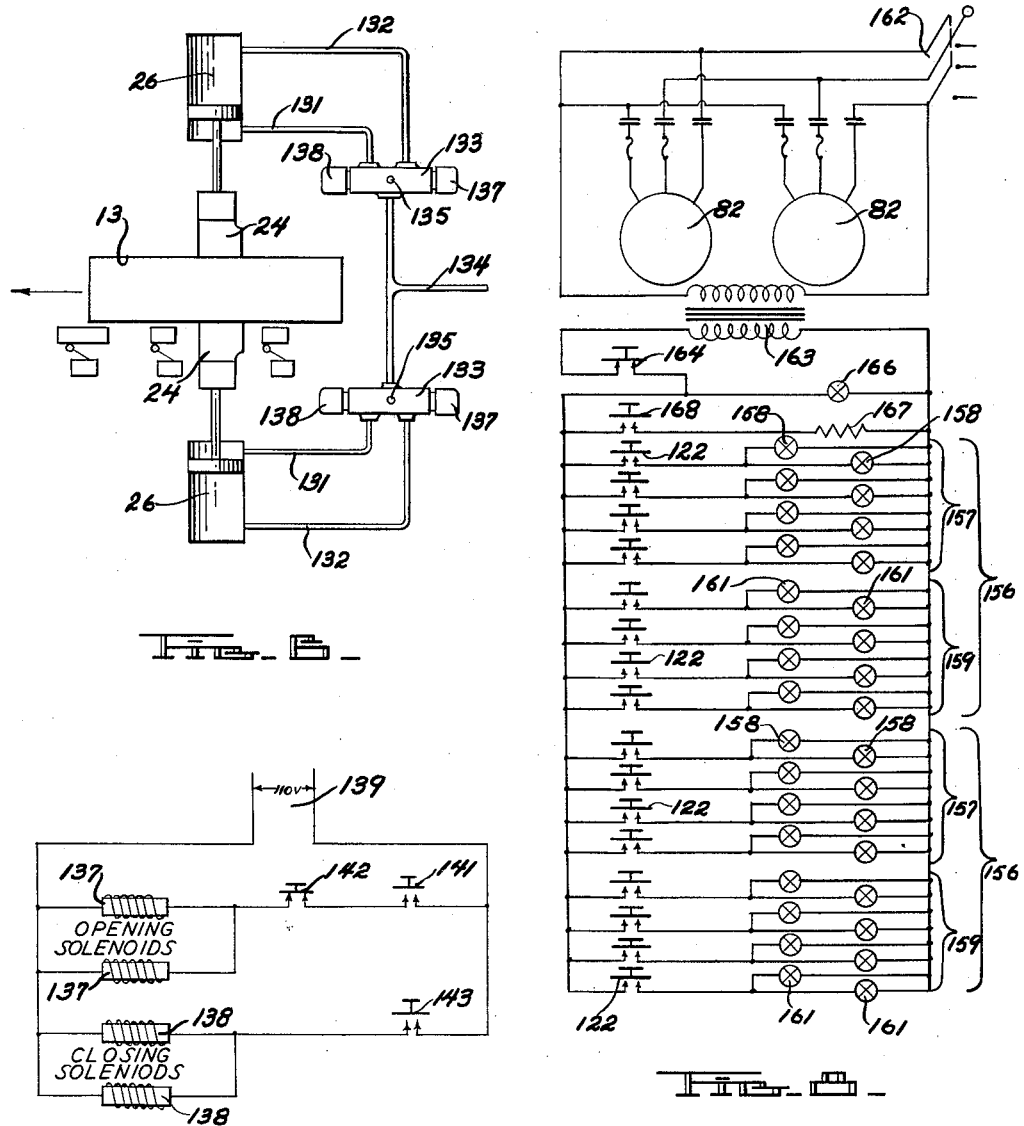
E. PLEASANCE
INVENTOR.
BY E. C. McRae
J. R. Faulkner
T. H. Oster
ATTORNEYS Patented May 27, 1952

2,598,599

UNITED STATES PATENT OFFICE 2,598,599

WHEEL ALIGNMENT GAUGE

Edwin Pleasance, Detroit, Mich., assignor to Ford Motor Company, Dearborn, Mich., a corporation of Delaware Application May 8, 1948, Serial No. 25,927

14 Claims. (Cl. 33—203.13)

This invention relates to wheel alignment gages for checking the alignment of road wheels of motor vehicles.

The importance of securing proper wheel alignment in motor vehicles is well-recognized. Improper wheel alignment results in unnecessary and excessive tire wear, seriously affects the safety of the vehicle and its occupants, and also impairs riding comfort, smoothness, and quietness of operation. Although the rear wheels must also be properly aligned to prevent wobble, shimmy, etc., the principal problem is encountered in connection with the front steering wheels. It is customary to mount the front wheels of a motor vehicle in such a manner that adjustment for camber, caster, and toe-in may be readily made so that the desired wheel alignment can be obtained. The present tendency is to provide only a very small amount of camber and caster, and either a small amount of toe-in or zero toe-in.

While various gages are available for checking caster, camber and toe-in of road wheels, these tests are "static" tests, i. e., they are made when the vehicle is stationary. This equipment is far from satisfactory since it is generally unwieldly and time-consuming to operate and is also seriously lacking in accuracy. The wheel alignment under driving conditions and loads may be entirely different from that checked when the vehicle is stationary. As a result, wheels which are apparently in perfect alignment according to static tests made by existing equipment may be considerably out of alignment during operation, resulting in tire wear and the impairment of safety and comfort. It is accordingly an object of the present invention to provide a wheel alignment gage which will permit wheel alignment characteristics to be checked under conditions simulating normal or average driving conditions.

In the past it has been customary to adjust the front wheels to provide a small amount of toe-in, the principal reason for this toe-in adjustment being an attempt to have the wheels substantially parallel when the car is in motion to minimize rolling resistance and tire wear. The application of forces to the front wheels during movement of the vehicle includes the resistance to forward motion acting upon the wheels from the road and the force overcoming this resistance supplied to the wheel spindle through the suspension link. Due to lost motion and deflection of the various parts, this results in a tendency of the wheels to move apart in the front and to approach each other at the rear during operation of the car, and the insertion of a small amount of toe-in is designed to counteract this tendency. At best, this practice is only an approximation and does not insure proper operation under driving conditions. Furthermore, it is difficult to check for wheel shimmy and wheel wobble by existing methods.

Since under operating conditions it is desirable to eliminate scuffing or lateral thrust between the tires and the road, it is important to ascertain whether any such lateral thrust or scuffing action exists, and to be able to tell when this undesirable condition is eliminated by adjustment of the steering mechanism. This is accomplished by the present invention by providing a member simulating a movable frictionless section of roadway, free to move laterally, in combination with an indicating or signal system arranged to indicate the amount of lateral thrust imposed upon the simulated roadway by the vehicle wheel rotating at a normal speed. While various constructions are contemplated, an embodiment of the invention includes a drum having a spherical outer surface upon which the front road wheel is adapted to rest, together with means for rotating the drum at a predetermined speed to simulate an average car speed. The drum is mounted not only for rotation about a transverse horizontal axis, but also for angular movement or oscillation about a longitudinal axis. Any lateral outward thrust upon the drum by the road wheel, as for example when the wheel is toed in, will be reflected by a rotation of the drum about its longitudinal axis and a corresponding indication in the signal system. The steering tie rod connected to that wheel can then be adjusted to eliminate the rolling of the drum and to obtain a condition of the zero side thrust. Likewise, an inward thrust upon the drum by the road wheel, as for example resulting from the wheel being toed out, results in rotating the drum inwardly and this rotation is likewise recorded upon the indicating system. It is thus possible to independently adjust each front road wheel under average operating conditions and to eliminate side thrust and road scuffing.

It is another object of the invention to provide a wheel alignment gage which is sensitive to wheel shimmy, wheel wobble, and other misalignment characteristics. It is difficult if not impossible to accurately determine these characteristics with normal checking apparatus when the vehicle is stationary, since these conditions show up accurately only when the vehicle is operating. With the present invention, however, the existence and magnitude of these conditions can be readily determined, and it is thus possible to take corrective measures.

Still another object of the invention is to provide a wheel alignment gage which can be utilized in connection with the assembly of vehicles, and in fact can be used directly upon the assembly line so as to insure that all newly built vehicles have proper wheel alignment characteristics. The arrangement is such that the wheel alignment can be rapidly checked and the necessary adjustment made without interfering with the normal progress of the assembly line. The mechanism, however, can also be used with normal service operations, to check and effect the proper wheel alignment of vehicles that have been driven for some time.

Other wheel alignment characteristics, such as camber, may vary from car to car and may affect the lateral thrust between the road wheels and the road. The wheel alignment gage of the present invention enables the toe-in to be adjusted in such manner that the lateral thrust and scuffing is substantially eliminated regardless of the particular adjustment of other wheel alignment characteristics. Thus, regardless of manufacturing variations and adjustments it is now possible to check and to adjust the road wheels to provide true "roadability" and to minimize side thrust, tire wear, etc.

Another object of the invention is to provide a wheel alignment gage which is of sturdy construction and will withstand continued operation, and which may be readily adjusted to simulate various driving speeds as desired. The invention also contemplates the provision of means for guiding the road wheels of a vehicle onto the gage and locating them accurately for testing purposes, while at the same time providing means for protecting the mechanism from unnecessary shock due to the driving of the rear wheels over the mechanism. Other objects include the provision of electrically operated indicating mechanism for accurately indicating the amount and direction of side thrust of each of the front wheels of a vehicle so that the proper adjustment can readily be made to the steering mechanism; the provision of a wheel alignment gage will then enable the steering wheel of the car to be located in the proper neutral or central position when the front wheels are in the straightahead position; and means for adjusting the sensitivity of the alignment gages for each of the front wheels to effect a balanced operation between the two units.

Other objects and advantages of this invention will be made more apparent as this description proceeds, particularly when considered in connection with the accompanying drawings, wherein:

Figure 6 is a semidiagrammatic plan view of the hydraulically operated cover plates for the wheel alignment gages.

Figure 7 is an electrical diagram indicating the electrical circuit and arrangement for controlling the opening and closing of the cover plates for the wheel alignment gages.

Figure 8 is an electrical diagram of the circuit to the drum motors and to the signal panels.

Figure 1:
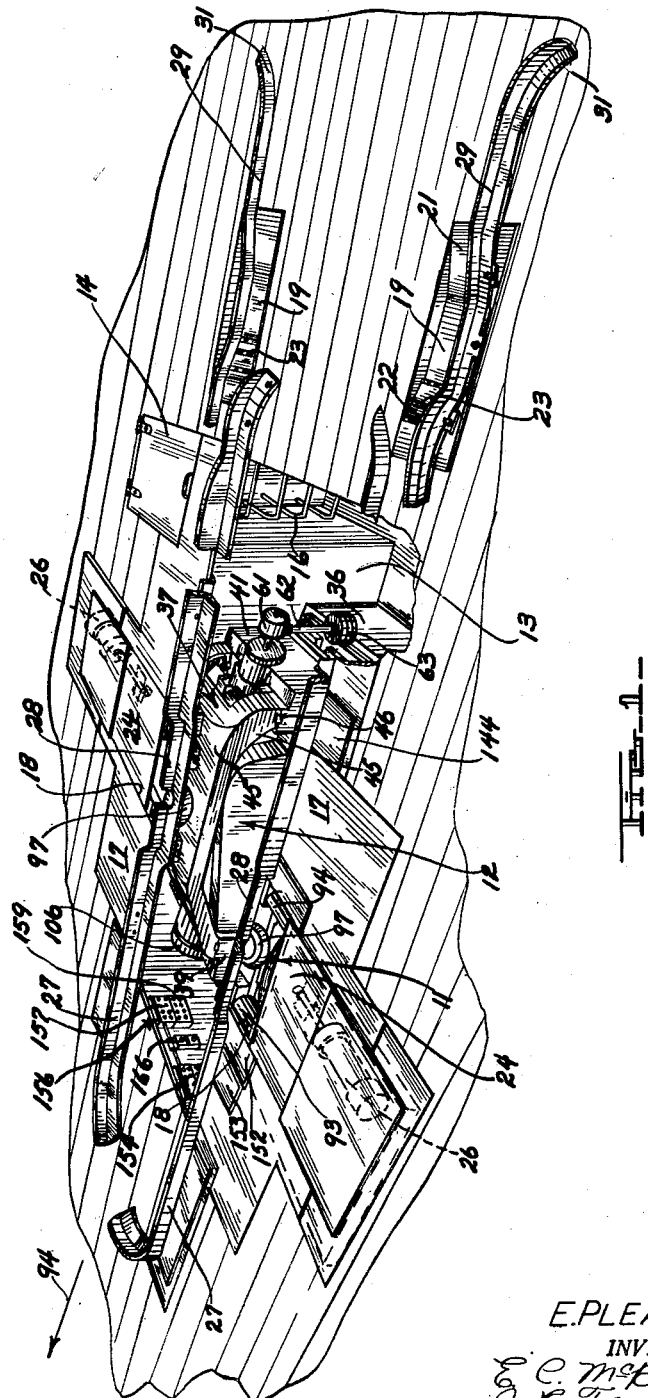
Figure 1 is a perspective view, partly broken away, of an installation including wheel alignment gages for each of the front wheels of a vehicle, together with an associated structure comprising a complete unit.

Referring now to the drawings, there is shown in Figure 1 a complete installation for checking the alignment of the front wheels of a motor vehicle. The installation includes left and right wheel alignment gage units 11 and 12 respectively mounted adjacent each other in a pit 13 formed in the floor. Access to the pit is had through a manifold cover 14 and a ladder 16. The center of the pit is open so that access may be had by mechanics working in the pit to the underside of the vehicle positioned over the pit to make the necessary adjustment to the steering linkage of the vehicle. The side portions of the pit are, however, covered by side plates 17 formed of steel and suitably supported. The side plates 17 are generally T-shaped and each is provided with openings 18 located directly above the respective wheel alignment gage. The arrangement is such that when the vehicle is driven over the pit, the front wheels drop downwardly through the openings 18 into engagement with the wheel alignment gages.

Since the front wheels are thus dropped below the floor level, it is necessary to drop the rear wheels a similar distance in order to maintain the vehicle in a level position. This is accomplished by providing supporting plates 19 for the rear wheels, the plates 19 being mounted in depressions formed in the floor and having ramps 21 and 22 at opposite ends to facilitate the entrance and exit of the wheels into and from the depressions. Transverse cleats 23 are formed on the forward ramp 22 to assist in providing sufficient traction for the rear wheels so that the front and rear wheels may simultaneously be lifted to the floor level.

Although the openings 18 must be opened to permit the entrance of the front wheels on to the wheel alignment gages, it is advisable to close these openings to permit the passage of the rear wheels thereover as the vehicle is driven away from its position over the pit. This is accomplished by providing laterally slidable cover plates 24. The cover plates 24 are slidably mounted upon the side plates 17 and are moved transversely by means of air cylinders 26. Suitable mechanism, described more in detail hereinafter, is employed to control the operation of the slidable cover plates 24 automatically, so that they will be opened for the admission of the front wheels at the proper time and will be closed to support the rear wheels as they pass over the openings 18.

In addition to providing means for supporting the motor vehicle in a horizontal position over the pit 13, it is necessary to provide suitable means for guiding the vehicle longitudinally so that it will be in proper alignment with the wheel alignment gages. For this purpose there is provided a pair of guide rails 27 formed of angle iron and mounted upon the side plates 17. The upright flanges of the guide rail 27 are adapted to guide the inner surfaces of the front wheel tires as the vehicle is driven over the pit. Adjacent the openings 18 in the side plates 17, the guide rails 27 are offset inwardly, as at 28, to provide suitable clearance for the front wheels when the latter are dropped into an engagement with the wheel alignment gages. In this position the front wheels are located transversely by means of guide wheels mounted upon the wheel alignment gages, as will be described more in detail later. Similar guide rails 29 are mounted upon the depressed supporting plates 19 for the rear wheels, the upright flanges of the rear guide rails being arranged to engage and guide the outer surfaces of the rear wheel tires. The rear ends of the rear guide rails are flared outwardly, as at 31, to assist in guiding the vehicle into position. If desired, the front and rear guide rails 27 and 29 may be mounted for transverse adjustment to permit compensation for minor variations in wheel treads and tire sizes.

In general the wheel alignment gage units 11 and 12 for the left and right wheels of the vehicle are similar, and consequently only one will be described in detail. In Figure 1 of the drawing, the left wheel alignment gage unit 11 is largely concealed within the pit 13 while the right wheel alignment gage unit may be clearly seen through the opening between the side cover plates 17. The pit 13 must be deep enough to permit mechanics to stand beneath the car being checked, and since the over-all height of the wheel alignment gage unit is substantially less than the depth of the pit, slabs 36 are provided for supporting the gage units.

Figure 2:
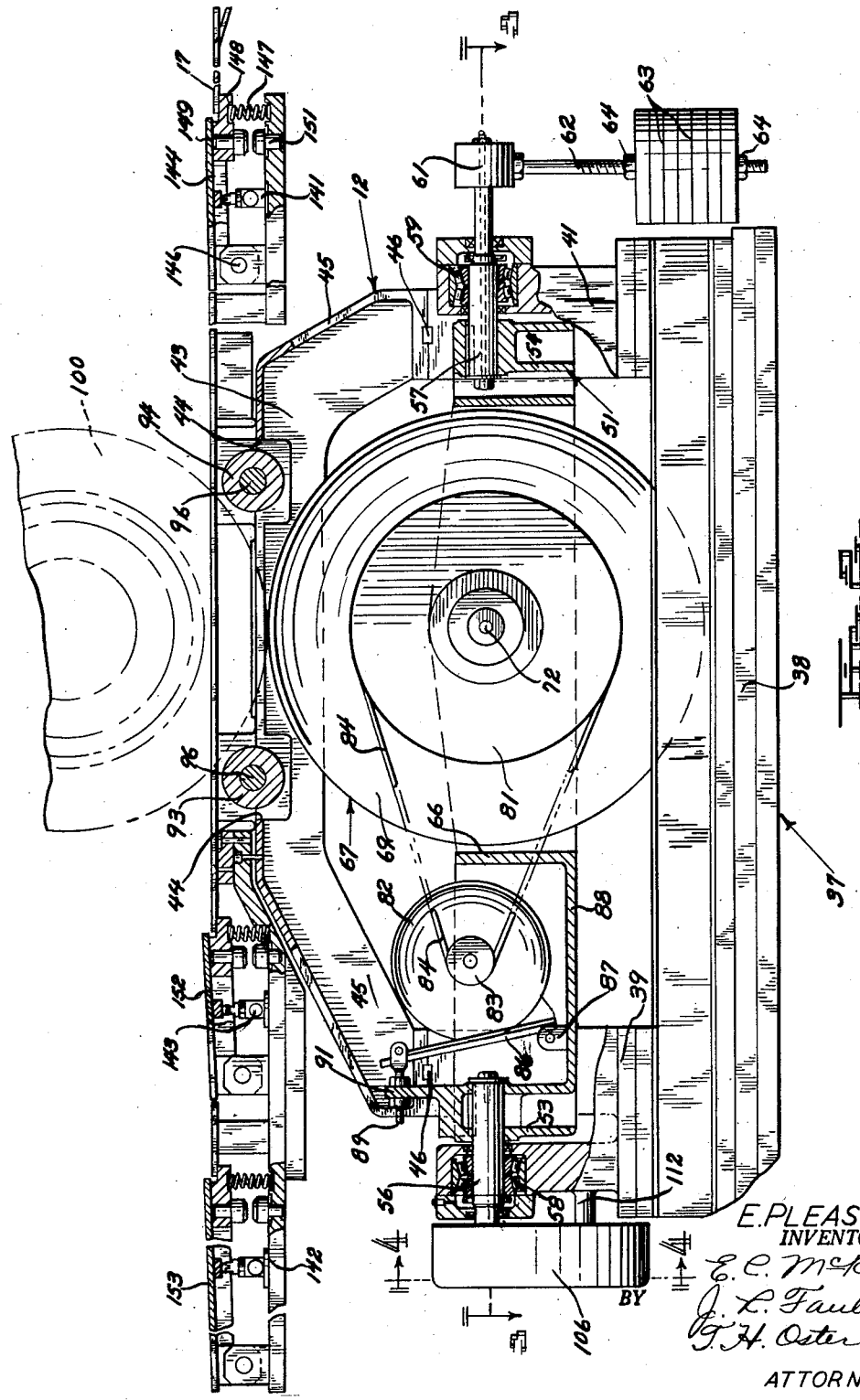
Figure 2 is a longitudinal vertical sectional view through one of the wheel alignment gages shown in Figure 1, the section being taken on the plane indicated by the line 2—2 of Figure 3.
Figure 3:
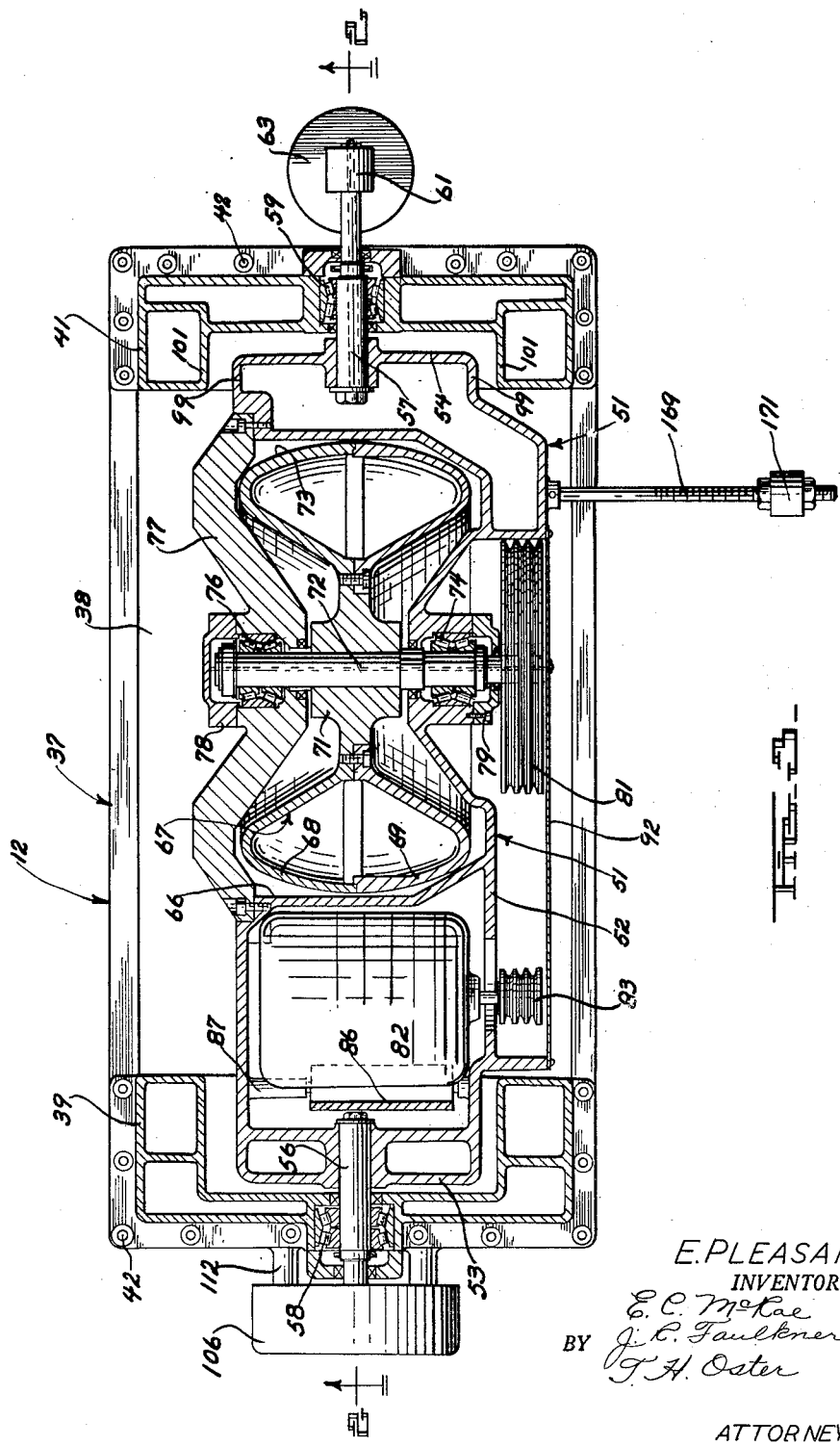
Figure 3 is a longitudinal horizontal cross sectional view taken substantially on the plane indicated by the line 3—3 of Figure 2.

Referring now to Figures 2 and 3 as well as Figure 1, the right wheel alignment gage unit 12 is mounted within a stationary housing supported upon the slab 36. The housing 37 comprises a base 38 rigidly mounted upon the slab 36, front and rear end walls 39 and 41 bolted to the base 38 by means of bolts 42, and a top wall 43. The base, end walls and top are formed of castings, and the top wall is in the form of an open framework with an opening 44 in the top thereof for the entrance of the vehicle wheel. The top is formed with downwardly depending legs 45 which rest upon the upper portions of the front and rear end walls 39 and 41 respectively. The legs 45 of the top wall are keyed to the end walls by means of keys 46 and in addition may be suitably bolted thereto. The various sections of the housing are ribbed and braced for strength since each gage unit must support one-half of the weight of the front portion of the motor vehicle.

A yoke 51 is mounted within the stationary housing 37 for angular movement about a longitudinal axis. As best seen in Figure 3, the yoke 51 is of generally rectangular shape and has a side wall 52 and end walls 53 and 54. Trunnions 56 and 57 are mounted in the front and rear end walls 53 and 54 of the yoke and extend outwardly therefrom. The extending portion of the front trunnion 56 is journaled in roller bearings 58 mounted in the front end wall 39 of the stationary housing 37, while the rearwardly extending portion of the rear trunnion 57 is similarly journaled in roller bearings 59 mounted in the rear end wall 41 of the housing. From the foregoing it will be seen that the yoke 51 is mounted for angular movement about a longitudinal axis which is parallel to the center line of the car being checked, the proper alignment of the car being assured by the guide rails 27 and 29 previously mentioned.

The rear trunnion 57 extends rearwardly through the bearings 59 and carries a collar 61 from which depends a rod 62. The rod 62 is threaded and supports a number of relatively heavy metal disks 63 forming a counterweight. It will be apparent that the weight of the counterweight may be varied as desired by increasing or decreasing the number of the disks 63, and that the effective lever arm may also be changed by raising or lowering the disks upon the rod 62 and locking the disks in position by means of the locking nuts 64. The counterweight 63 tends to keep the yoke 51 in a neutral or horizontal position.

As best seen in Figure 3, a relatively large opening or cylindrical recess 66 is provided in the yoke 51 for receiving a drum 67. The drum 67 is formed in two halves 68 and 69, the part 68 having a central hub 71 mounted upon a shaft 72 and the part 69 being suitably bolted or otherwise secured to the part 68. The exterior surface 73 of the drum 67 is formed in the shape of a portion of a sphere. The drum shaft 72 is journaled at one end in roller bearings 74 mounted in the side wall 52 of the yoke 51, while the opposite end of the shaft is journaled in roller bearings 76 mounted within a recess formed in the side plate 77 which is bolted to the yoke 51 and covers the cylindrical opening 66. Suitable cover plates 78 and 79 enclose the ends of the drum shaft 72, the cover plate 79 being apertured to permit the drum shaft to extend therethrough.

A multiple groove pulley 81 is mounted upon the extended end of the drum shaft 72. The drum 67 is adapted to be rotated about the axis of the drum shaft 72 by means of an electric motor 82 having a pulley 83 drivingly connected to the drum pulley 81 by means of a multiple V-belt 84. The motor 82 is mounted upon a base plate 86, the lower edge of which is pivotally mounted upon a bracket 87 carried by the bottom wall 88 of the yoke 51. The upper end of the motor base 86 is adjustably connected by means of a threaded rod 89 to a stationary flange 91 extending upwardly from the front end wall 53 of the yoke 51. This arrangement of course permits adjustment of the motor 82 to tighten the belt 84. From the foregoing it will be seen that the drum 67 is mounted for rotation about a normally transverse axis, namely, the drum shaft 72 journaled in the yoke 51; and that the yoke 51 in turn is mounted for angular movement about a longitudinal axis formed by the front and rear trunnions 56 and 57 which are journaled in the end walls 39 and 41 respectively of the stationary housing 37. A suitable protecting plate 92 is detachably secured to the side wall 52 of the yoke 51 to form a shield covering the pulleys 81 and 83 and the belt 84.

Upon reference to Figure 2 it will be noted that the road wheel 100, shown in phantom, projects through the opening 44 formed in the top wall 43 of the stationary housing and rests upon the upper surface of the spherically shaped drum 67. Rollers 93 and 94 are mounted for free rotation about transversely extending shafts 96 journaled in bosses formed in the top wall 43 of the housing. The rollers 93 and 94 serve to center the vehicle wheel in a longitudinal direction directly above the drum 67. As mentioned above and as best shown in Figure 1, the guide rails 27 for the front wheels are offset inwardly to provide clearance adjacent the front tires, and the front wheels of the vehicle are held in their proper transverse position by means of a roller 97 mounted upon the top wall 43 of the housing 37 of each of the wheel alignment gage units for free rotation about a vertical axis. The rollers 97 are adapted to engage the inner surfaces of the front wheel tires. The arrangement is such that the vehicle tires are located directly above and in vertical alignment with the center plane of the drum 67, and also in vertical alignment with the longitudinal trunnions 56 and 57 of the yoke 51.

In operation the drum 67 is continually driven by the motor 82 and the frictional engagement between the front wheel tire and the drum results in a corresponding rotation of the front wheel. If the front wheel is perfectly aligned with the drum 67, and toes neither in or out nor has any inherent wobble or shimmy, it will be apparent that the rotation of the drum and the tire will not result in angular movement of the yoke 51 about its longitudinal axis. On the other hand, if the vertical central plane of the wheel and tire is out of alignment with the vertical central plane of the drum, as would be the case if the wheel toes either in or out, the tire will exert a side or lateral thrust upon the drum. Since the drum is mounted on the yoke 51 which is freely rotatable about the longitudinal axis formed by the front and rear trunnions 56 and 57 respectively, it will be seen that a sidewise thrust upon the drum results in angularly moving the yoke in one direction or the other depending upon the direction of the thrust. This angular movement of the yoke is of course resisted by the counterweight 63, and the counterweight is adjusted so that with a predetermined maximum probable misalignment of the vehicle wheel (approximately three to five degrees for example) the maximum movement of the drum in either direction will be limited to the over-all width of the drum so that the tire will not roll off the sides of the spherical surface 73 of the drum. In addition, excessive angular movement of the yoke and drum is prevented by engagement of the end portions 99 of the yoke 51 with the adjacent walls 101 of the end wall 41 of the stationary housing 37, the last-mentioned walls thus forming stops limiting the oscillation of the yoke. It will of course be understood that transverse slippage occurs between the spherical surface 73 of the drum and the periphery of the tire, since otherwise the yoke and drum would continue to revolve in one direction about the longitudinal axis of rotation of the yoke if the vehicle wheels were out of alignment. The amount of angular movement depends upon the speed of rotation of the drum and vehicle wheel, the friction between the two, and the position and weight of the counterweight.

By recording the amount of angular movement by suitable indicating mechanism it is possible to readily ascertain the character and the amount of misalignment of the wheel and the correction which should be made to correctly align it. The mechanism for indicating the direction and amount of oscillation will now be described.

Figure 4:
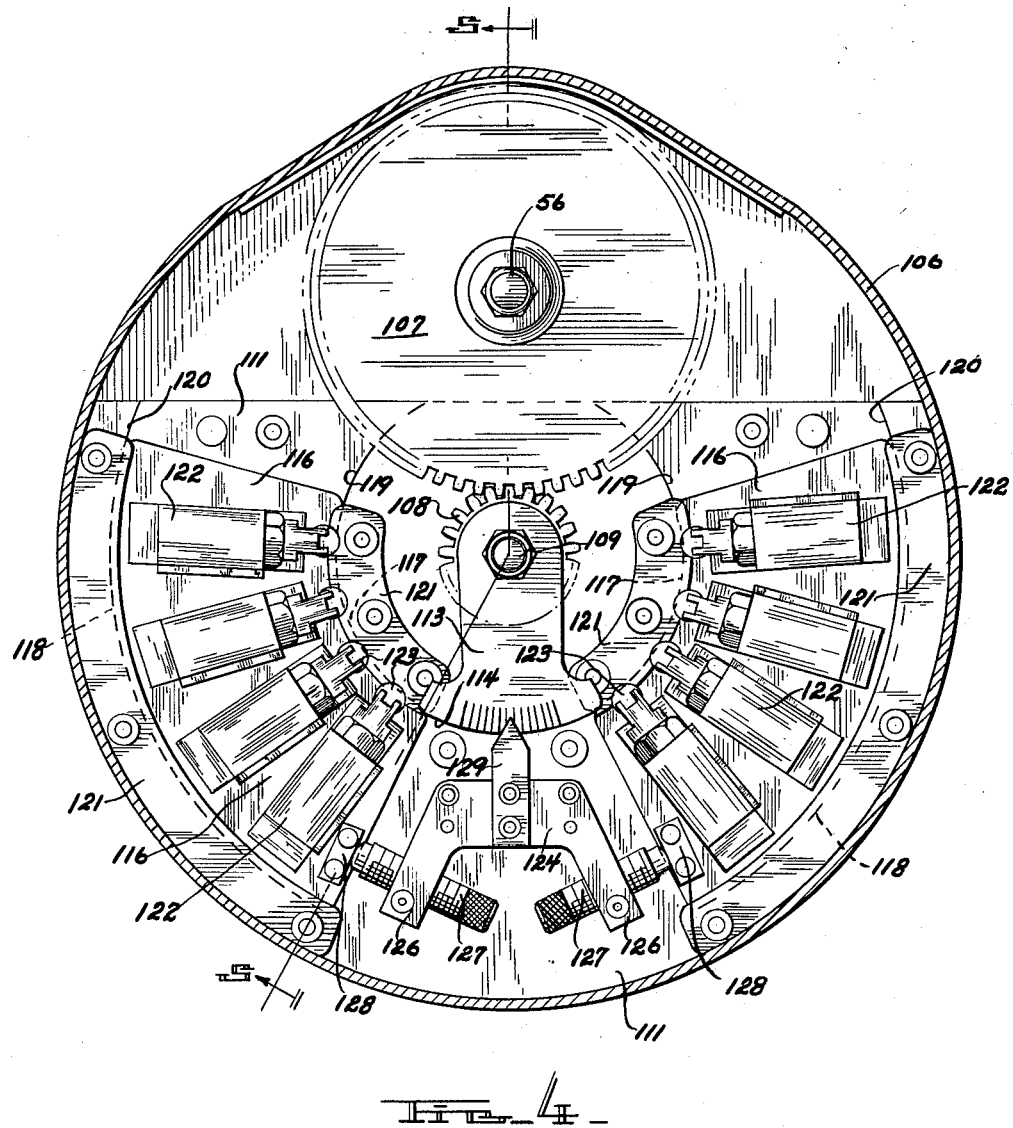
Figure 4 is an enlarged vertical cross sectional view taken on the plane indicated by the line 4—4 in Figure 2, and illustrating a switch box of the indicating mechanism.
Figure 5:
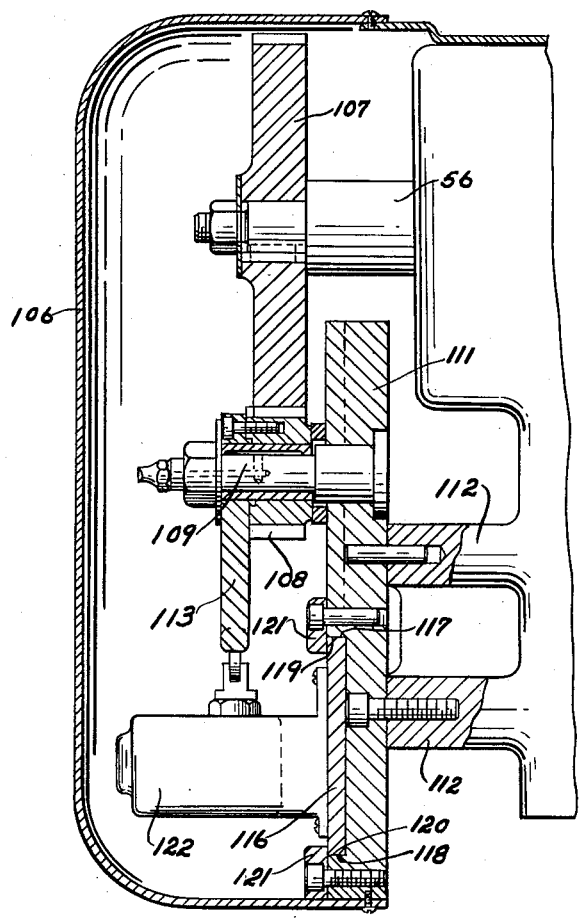
Figure 5 is a vertical cross sectional view taken on the plane indicated by the line 5—5 of Figure 4.

It will be seen from an examination of Figures 1, 2, and 3 that the forward trunnion 56 for the yoke 51 extends forwardly beyond the roller bearing 58 and into a switch housing 106. Reference is now made to Figures 4 and 5 for a complete description of the switch mechanism. It will be seen that the spur gear 107 is secured to the forward end of the trunnion 56 and meshes with a pinion 108 journaled upon a subshaft 109 mounted upon a bracket 111 which in turn is bolted to bosses 112 extending forwardly from the front end wall 39 of the stationary gage housing 37. An actuating arm 113 is mounted upon the pinion 108 for rotation therewith and has an outer cam face 114 concentric with the axis of the stub shaft 109. It will be seen that rotation of the yoke 51 thus effects a rotation of the actuating arm 113, the speed of rotation of the arm being faster due to the ratio between the gear 107 and the pinion 108.

A pair of switch plates 116 are adjustably mounted upon the bracket 111, one plate being on each side of the vertical centerline of the bracket. Each switch plate 116 is formed with radially inner and outer arcuate faces 117 and 118 which are guided within correspondingly shaped arcuate guideways 119 and 120 respectively formed in the bracket 111. The plates 116 are held in the guideways by overlapping guide strips 121. A plurality of electrical switches 122, in this case four, are mounted in angularly spaced relationship upon each of the switch plates 116. The arrangement is such that the contacts 123 of the switches 122 extend into the path of the cam face 114 of the actuating arm 113 so that a sufficient rotation of the arm results in depressing one or more of the contacts 123. The circumferential extent of the cam face 114 of the actuating arm 113 is sufficient to cover the contacts 123 of all four of the electrical switches on either switch plate 116, so that either one, two, three, or four of the switches will be operated depending upon the extent of angular movement of the actuating arm 113. This is of course governed by the amount of angular movement of the yoke 51 of the gage, and this in turn is proportionate to the amount of toe-in or toe-out of the front wheel of the vehicle, as the case may be. It will be seen that a certain rotary movement of the yoke will result in actuating one of the switches 122, while the others will be successively actuated as the angular movement increases.

Means are provided for adjusting the switch plates 116 circumferentially so that the first switch may be actuated upon any desired initial angular movement of the yoke. This means comprises a bracket 124 mounted upon the supporting bracket 111 and having downwardly extending arms 126 through which extend adjusting screws 127. The ends of the screws engage stops 128 on the switch plates 116, and it will be apparent that adjustment of the screws 127 results in angularly adjusting the location of the switch plates 116 and consequently the location of the electrical switches 122. The bracket 124 also carries a pointer 129 which may be used to properly center the actuating arm 113 between the two switch plates 116.

*Operation*

It is important in the installation of the left and right wheel alignment gage units 11 and 12 that they be mounted perfectly level and that the upper surfaces of the drums be equally spaced from the floor level. In addition, the axes of the two drums must be in alignment with each other and the longitudinal axes of rotation of the two yokes must be parallel.

When installing the two wheel alignment gage units in the pit, it is necessary to balance the drums 67 with each other. This is accomplished by attaching a balance arm 169 and the weight 171 to the yoke 51, as shown in Figure 3. The weight is positioned on the arm to obtain a predetermined angular movement of the drum, then it is transferred to the other wheel alignment gage unit and similarly mounted. The counterweight of the other gauge unit is adjusted until the balance arm and weight swing through the same predetermined angle as with the first gage unit. The arm and weight are then removed.

In operation the drums 67 are constantly driven by the electric motors 82, a speed being selected which is representative of an average car speed, as for example, 28 miles per hour. One or two mechanics are stationed in the pit 13 with suitable wrenches for adjusting the tie rods of the steering mechanism when necessary. The car is then driven slowly over the pit until the front wheels drop through the openings 18 in the side plates 17 and onto the drums 67. At the same time the rear wheels drop into the depressed supporting plates 19 so that the car will be level. The front and rear guide rails 27 and 29 assist in driving the car over the pit in the proper longitudinal alignment. The front wheels are rotated by frictional engagement with the rotating drums, and are held in position longitudinally by means of the rollers 93 and 94. At the same time they are held in the proper transverse position by means of the rollers 97 supported upon the top wall 43 of the housing 37. The rollers 97 rotate freely about vertical axes and engage the inner surfaces of the front tires.

The driver remains in the car, and additional weight may be added to the car if necessary to simulate operating conditions. The driver then rotates the steering wheel until it is in the proper normal position for straight-ahead driving. This can be judged by the position of the steering wheel spokes. During checking and adjustment of the wheel alignment, the driver holds the steering wheel rigidly in this central position. If a front wheel is not in proper alignment longitudinally, as for example if it toes in or out, the wheel will exert a sideward thrust upon the rotating drum of the corresponding gage unit. For example, if the wheel toes in, it exerts an outward thrust upon the drum and rotates the drum in such manner to move the upper part thereof outwardly. The yoke 51, within which the drum 67 is rotatably mounted, thus rotates about its longitudinal pivotal axis. Conversely, if the wheel toes out, an inward thrust is exerted upon the drum and the drum and yoke revolve in the opposite direction. For any given amount of toe-in or toe-out, the drum and yoke will rotate through a predetermined angular movement which is proportional to the amount of wheel misalignment.

By means of the indicating mechanism to be described shortly, the amount of toe-in or toe-out can be seen at a glance, and the mechanic in the pit can adjust the tie rod for the misaligned wheel to bring it back into perfect alignment. When the wheel is perfectly aligned there is no lateral thrust upon the rotating drum and consequently there is no tendency for the yoke to rotate about its longitudinal axis.

In addition to being sensitive to toe-in or toe-out conditions, the gage unit is responsive to wobble, wheel shimmy, and other characteristics of wheel misalignment. Wheel wobble and wheel shimmy result in a rapid oscillation or vibration of the yoke about its longitudinal axis, the amplitude of the oscillation depending upon the amount of wheel wobble or shimmy.

*Cover plate control circuit*

Reference is made to Figure 6 for a diagrammatic view and circuit diagram of the control means for opening and closing the cover plates 24. It will be recalled that the sliding cover plates 24 are adapted to uncover the openings 18 in the side plates 17 to permit the front wheels of the vehicle to drop onto the drums 67 of the wheel alignment gage units, for checking purposes, and are then adapted to be moved inwardly to cover the openings and permit the rear wheels of the vehicle to cross without falling onto the drums. The transverse sliding movement of the cover plates 24 is accomplished by actuation of the two air cylinders 26. Conduits 131 and 132 lead from the inner and outer ends respectively of each pair of cylinders 26 and communicate with conventional four-way solenoid operated piston type air valves 133, of the conventional type. Each air valve 133 is supplied with air pressure from a supply conduit 134. It is apparent that with an air valve 133 in one position, air pressure is supplied through its conduit 131 to one air cylinder 26 to move the respective cover plate 24 outwardly, while the other conduit 132 serves as an exhaust passage, exhausting through the exhaust port 135 of the valve. Reversal of the valve 133 effects a reversal in the air flow and moves the cover plate 24 inwardly.

Each air valve 133 is controlled by a pair of solenoids 137 and 138, the solenoids 137 when energized functioning to open the cover plates 24 and the solenoids 138 when energized functioning to close the cover plates 24. It will be seen in Figure 7 that the opening solenoids 137 are connected in parallel in an electrical circuit supplied with power from a power source 139. Similarly, the closing solenoids 138 are in parallel with each other. Two limit switches 141 and 142 are arranged in series with the circuit of the opening solenoids 137, while a single limit switch 143 is in series in the circuit of the closing solenoids 138.

Referring now to Figures 1 and 2 it will be seen that the limit switch 141 is operated by a switch plate 144 mounted in an opening in the side plate 17 in the path of the left front wheel of the vehicle as it is driven over the pit. The switch plate 144 is pivotally mounted at 146 and is normally urged upwardly by a coil spring 147, upward movement being limited by the engagement of a stop 148 carried by the switch plate 144 with the adjacent edge of the side plate 17. In this position, the switch plate 144 is slightly raised above the level of the side plate 17, and the limit switch 141 is open. Thus the limit switch 141, which normally is in an open position, is closed when the front wheels of the vehicle pass over the switch plate 144. Since the limit switch 142 is normally closed (see Figure 7), the actuation of the switch 141 by the front wheel results in completing a circuit through the opening solenoids 137 which, as described above, causes the air cylinders 26 to move the cover plates 24 laterally outwardly to uncover the openings 18 in the side plates 17 and permit the front wheels to drop onto the revolving drums 67. Downward movement of the switch plate 144 is limited by the engagement of a stop 149 carried by the switch plate with a stationary stop 151.

The limit switch 143 in the circuit of the closing solenoids 138 is similarly operated by a pivoted switch plate 152 located in the path of the left front wheel of the vehicle on the opposite side of the openings 18 from the switch plate 144. The arrangement is such that after the vehicle has been checked and is driven forwardly from its checking position, the left front wheel strikes the switch plate 152 to close the switch 143 completing the circuit to the closing solenoids 138. The air cylinders 26 then move the cover plates 24 laterally inwardly to cover the openings 18. This is accomplished before the vehicle has been driven far enough for the rear wheels of the vehicle to reach the opening 18. The mechanism of the wheel alignment unit is thus protected from unnecessary shock which would result if the rear wheels were permitted to fall through the openings 18 into an engagement with the drums 67.

Provision is also made for preventing the cover plates 24 from opening when the rear wheel of the vehicle strikes the switch plate 144. By the time the rear wheel reaches the switch plate 144, the front wheel is resting upon a switch plate 153 causing the normally open limit switch 142 to be held in open position so that the circuit to the opening solenoids 137 is broken and operation of the air cylinders 26 prevented. The switch plate 153 is long enough to prevent actuation of the limit switch 141 by the rear wheels.

From the foregoing it will be seen that means are provided for automatically opening and closing the cover plates 24 as required, so that no attention need be given to this mechanism by the operator.

Wheel alignment indicating mechanism

Attention is directed to Figure 8 which shows the electrical circuit diagram controlling the indicating signal devices employed to advise the operator of the wheel alignment conditions. While various types of indicating devices may be employed, the mechanism shown herein comprises a signal panel 156 for each of the wheel alignment gage units. As seen in Figure 1 each signal panel 156 comprises an upper section 157 having four pairs of yellow light bulbs 158 and a lower section 159 having four pairs of green light bulbs 161.

Referring to Figure 8, a power supply 162 supplies power to the electric motors 82 which drive the drums 67 of the gage units and also supply power to the primary of the transformer 163, the secondary of which supplies power to an electrical circuit including the signal panels 156. It will be noted that a plurality of parallel circuits are provided in the upper section 157 one of the switches 122 (Figure 4) and a pair of each signal panel 156, each circuit including of yellow lights 158. A pair of lights are provided in parallel with each other in each circuit so that the failure of one light bulb will still leave the other bulb burning and will not give a false indication of wheel alignment to the operator. Similarly, the lower section 159 of each signal panel 156 contains a plurality of parallel circuits each containing a switch 122 and a pair of green lights 161.

The two signal panels 156 are identical in construction and in electrical connection, each serving one wheel alignment gage unit. A circuit switch 164 is provided to complete the circuits to the signal panels 156, an indicator light 166 being provided in the circuit to guard against a circuit failure causing the operator to misinterpret the inoperation of the lights 158 and 161 as meaning that the wheels are in proper alignment. A horn 167 manually operated by a switch 168 is provided and is operated by the operator when the wheel alignment adjustments are complete so that the driver of the car may know that he may then drive the car away from the pit.

Operation of signal panels and adjustment of wheel alignment

With the vehicle in position over the pit and with the front wheels resting upon the rotating drums 67, the operator or operators may check and adjust each of the front wheels independently. The right wheel alignment gage unit 12 and the interconnected switch unit 106 operate to indicate on the signal panel 156 the degree of misalignment of the right wheel. As previously discussed, if the wheel toes in, the laterally outward thrust upon the drum 67 causes rotation of the latter and its supporting yoke 51 in a clockwise direction as viewed in the direction of travel of the vehicle. This results in a clockwise rotation of the actuating arm 133 as viewed in Figure 4, and the engagement and closing of one or more of the switches 122 depending upon the amount of wheel toe-in and the corresponding angular movement of the drum and yoke. If only the first switch 122 is actuated then only one pair of yellow lights 158 will flash, while if the toe-in is greater, then a larger number of the switches 122 will be actuated and a corresponding number of the pairs of yellow lights 158 will be lighted. The operator can then see at a glance the amount of toe-in and can make the necessary adjustment to the tie rod for the right wheel. The tie rod is adjusted by gradually lengthening or shortening it until all of the yellow lights are out, indicating that all of the toe-in has been removed. Similarly, toe-out of the right wheel results in a laterally inward thrust upon the drum 67 and a counterclockwise rotation of the drum at its yoke 51, causing the actuating arm 113 in Figure 4 to swing in a counterclockwise direction and actuate one or more of the switches 122 at the left-hand side of Figure 4. This in turn results in lighting one or more pairs of the green lights 161, indicating to the operator the amount of toe-out. By thus watching the signal panel for the right wheel, the operator may make suitable adjustments until all of the green and yellow lights are out, and he will then know that the wheel alignment is correct and that the right wheel is not exerting any appreciable sidewise thrust upon the drum. The alignment of the left front wheel is checked in a similar manner and the left-hand tie rod adjusted until all of the lights on the left-hand signal panel are out, indicating that the wheel is properly aligned. Since this check is made under conditions simulating driving conditions, the wheel will track during use and tire scuffing and unnecessary wear will be eliminated or at least greatly reduced. Furthermore, the steering will be smoother and the operation of the car safer.

As previously mentioned, the gage unit is sensitive to various types of misalignment other than toe-in and toe-out. For example, if there is an appreciable amount of wheel wobble or wheel shimmy, the drum and yoke will oscillate due to the reversal of lateral thrust upon the drum and the green and yellow lights will alternately flicker momentarily indicating to the operator the source of trouble. Furthermore, the magnitude of the wheel wobble or shimmy will be indicated by the number of green and yellow lights flashing.

The wheel alignment gage for the left front wheels can be checked and the left wheel tie rod adjusted by a second operator if desired to speed operation, or one operator may perform both operations. It has been found that the wheel alignment gage unit of the present invention will permit a relatively fast check to be made so that the vehicles can be completely checked and adjusted as they leave the assembly line without interfering with the normal progress of the lines.

In addition to checking the wheel alignment of cars just assembled, the equipment is useful in service garages, and may be used to check wheel alignment resulting from wear, etc. Furthermore, accidents may cause distortion of the various parts of the frame and steering linkage and this will immediately be apparent upon a check of the vehicle on the wheel alignment gage unit.

In view of the fact that the driver centers the steering wheel when he drives upon the gage unit, the subsequent adjustment of the tie rod results in the proper relationship being had between the steering wheel and the front road wheels so that when the steering wheel is held in the neutral position, the road wheels are in their straight ahead position. Variations in manufacturing and assembly are thus corrected. It has also been found that although the various adjustments to the wheels, including camber, are uniformly made during assembly of the vehicles, variations may occur which affect the roadability of the wheels. The proper wheel alignment to ensure correct roadability regardless of these variations is insured by the use of the present equipment.

Although I have shown and described certain embodiments of the invention, it will be understood that I do not wish to be limited to the exact construction shown and described, but that various changes and modifications may be made without departing from the spirit and scope of my invention, as defined in the appended claims.

What is claimed is:

1. A gage for checking wheel alignment comprising a drum having a spherical peripheral surface in frictional engagement with the periphery of the wheel, means mounting said drum for angular movement about longitudinal and transverse axes, means rotating said drum about said transverse axis, and means measuring the transverse force exerted by the wheel upon the drum tending to rotate said drum about said longitudinal axis.

2. A gage for checking wheel alignment comprising a drum having a spherical peripheral surface in frictional engagement with the periphery of the wheel, means for rotating said drum and said wheel, supporting means for said drum mounting the latter for angular movement about a longitudinal axis located substantially in the plane of rotation of the wheel, and means indicating the direction and magnitude of the angular movement of said drum.

3. A gage for checking wheel alignment comprising a drum in frictional engagement with the periphery of the wheel, means for rotating said drum, said wheel being rotated by reason of its frictional engagement with said rotating drum, a support for said drum, means mounting said support for angular movement about a longitudinal axis located substantially in the plane of rotation of the wheel, and means indicating the direction and magnitude of the angular movement of the support and the drum mounted thereon resulting from any transverse thrust exerted upon the drum by the wheel.

4. A gage for checking wheel alignment comprising a drum having a spherical peripheral surface in frictional engagement with the periphery of the wheel, means for rotating said drum and said wheel, supporting means for said drum mounting the latter for angular movement about a pivotal axis located substantially in the plane of rotation of said wheel, means resisting angular movement of said support and drum, and means measuring the direction and magnitude of said angular movement.

5. The structure defined by claim 4 which is further characterized in that the means resisting angular movement of the support and drum comprises an adjustable counterweight.

6. A gage for checking wheel alignment comprising a stationary housing, a frame pivotally mounted upon said housing for pivotal movement about a longitudinal axis, a drum mounted upon said frame for rotation about a normally transverse horizontal axis, power means carried by said frame for rotating said drum about said normally transverse horizontal axis, said drum having a spherical peripheral surface adapted to frictionally engage the periphery of the wheel and to thereby effect a rotation of the wheel, means resisting pivotal movement of said frame about its longitudinal pivotal axis but permitting limited pivotal movement of said frame in each direction as a result of transverse thrust exerted upon the periphery of the drum by the rotating wheel, and means measuring the direction and magnitude of the pivotal movement of said frame about said longitudinal axis.

7. The structure defined by claim 6 which is further characterized in that said measuring means includes a switch actuating arm rotatable in relation to the pivotal movement of said frame, a series of electrical switches arranged in angular relationship to each other adapted to be operated by said actuating arm, and a plurality of lights operted by said switches to indicate the direction and magnitude of the pivotal movement of said frame about its longitudinal axis.

8. Mechanism for checking the alignment of a vehicle wheel comprising a member in frictional engagement with the periphery of the wheel, a track for guiding the vehicle wheel in proper alignment with said member, an opening in said track over said member to permit the vehicle wheel to move into frictional engagement with said member, a cover plate for selectively closing said opening, power means for moving said cover plate between open and closed positions, and control means mounted in said track in the path of the vehicle wheel before it reaches said opening to actuate said power means and open said cover plate.

9. The structure defined by claim 8 which is further characterized in that additional control means are provided in said track in the path of the vehicle wheel and on the opposite side of said opening from said first-mentioned control means to actuate said power means in the opposite direction to close said cover plate.

10. Mechanism for checking the alignment of a vehicle wheel comprising a member adapted to frictionally engage the periphery of the wheel, a track for the wheels of the vehicle extending over said member, an opening in said track directly above said member to permit the front wheel of the vehicle to frictionally engage said member, guide rails for guiding the front and rear wheels of the vehicle in its movement along said track, additional guide means adjacent said opening for holding the front wheel of the vehicle in a predetermined position upon said member, a cover plate for selectively closing said opening, power means for opening and closing said cover plate, a valve controlling said power means, a trip plate in said track in the path of the vehicle wheels and arranged to be engaged by the front wheel before it reaches said opening and operative to control said valve to open said cover plate and permit the front wheel to move into frictional engagement with said member, a second trip plate in said track on the opposite side of said opening from said first trip plate and arranged to be engaged by the front wheel of the vehicle after the latter has been checked and the vehicle is being moved from its checking position, said second-mentioned trip plate controlling said valve to move said cover plate into position closing said opening to permit the passage of the rear wheel of the vehicle thereover without the latter engaging said member, and a third trip plate in said track in the path of the vehicle wheels and arranged to be engaged by the front wheel at the same time the first-mentioned trip plate is engaged by the rear wheel to prevent actuation of the latter from opening the cover plate.

11. Mechanism for checking the alignment of a vehicle wheel comprising a stationary housing, an elongated frame, aligned trunnions at the opposite ends of said frame pivotally supporting said frame upon said housing, a drum pivotally mounted upon said frame for rotation about an axis intersecting the common axis of said trunnions at right angles, said drum having a spherical peripheral surface adapted to frictionally engage the periphery of the wheel, power means supported upon said frame for rotating said drum, and means indicating the direction and magnitude of the pivotal movement of said frame resulting from a transverse thrust upon said drum from the wheel.

12. The structure defined by claim 11 which is further characterized in that one of said trunnions extends outwardly beyond said housing, a counterweight carried by and depending from the extension of said last-mentioned trunnion, and means for adjusting said counterweight radially of said last-mentioned trunnion.

13. The structure defined by claim 11 which is further characterized in that one of said trunnions extends outwardly beyond said housing, a switch actuating arm secured to the extension of said last-mentioned trunnion, a plurality of angularly spaced switches arranged for selective operation by said actuating arm, a plate supporting said switches, and means for angularly adjusting said plate relative to the neutral position of said actuating arm.

14. A gage for effecting the alignment of a vehicle wheel comprising a member having a spherical peripheral surface in engagement with the periphery of the wheel, means mounting said member for angular movement about an axis extending longitudinally of the vehicle, and means indicating the magnitude of the angular movement of said member about said longitudinal axis.

EDWIN PLEASANCE.

REFERENCES CITED

The following references are of record in the file of this patent:

UNITED STATES PATENTS

| Number | Name | Date |
| --- | --- | --- |
| 1,507,695 | Templeman et al. | Sept. 9, 1924 |
| 1,946,101 | Norton | Feb. 6, 1934 |
| 2,114,481 | Taber | Apr. 19, 1938 |

FOREIGN PATENTS

| Number | Country | Date |
| --- | --- | --- |
| 409,077 | Great Britain | Apr. 26, 1934 |